(12) United States Patent
Couzin

(10) Patent No.: US 7,445,347 B2
(45) Date of Patent: Nov. 4, 2008

(54) METALLIZED CUBE CORNER RETROREFLECTIVE SHEETING HAVING A HIGH MEASURED DAYTIME LUMINANCE FACTOR

(75) Inventor: Dennis I. Couzin, Frankfurt (DE)

(73) Assignee: Avery Dennison Corporation, Pasadena, CA (US)

( * ) Notice: Subject to any disclaimer, the term of this patent is extended or adjusted under 35 U.S.C. 154(b) by 294 days.

(21) Appl. No.: 11/269,903

(22) Filed: Nov. 9, 2005

(65) Prior Publication Data

US 2007/0103781 A1    May 10, 2007

(51) Int. Cl.
G02B 5/124    (2006.01)

(52) U.S. Cl. .................. 359/530; 359/529; 428/167

(58) Field of Classification Search .............. None
See application file for complete search history.

(56) References Cited

U.S. PATENT DOCUMENTS

| | | | |
|---|---|---|---|
| 4,588,258 | A | 5/1986 | Hoopman |
| 5,138,488 | A | 8/1992 | Szczech |
| 5,272,562 | A | 12/1993 | Coderre |
| 5,706,132 | A | 1/1998 | Nestegard et al. |
| 5,812,315 | A | 9/1998 | Smith et al. |
| 5,840,406 | A | 11/1998 | Nilsen |
| 6,083,607 | A | 7/2000 | Mimura et al. |
| 6,206,525 | B1 | 3/2001 | Rowland et al. |
| 6,457,835 | B1 | 10/2002 | Nilsen et al. |
| 2004/0114244 | A1* | 6/2004 | Couzin ................. 359/530 |
| 2004/0174603 | A1 | 9/2004 | Smith |

FOREIGN PATENT DOCUMENTS

| | | |
|---|---|---|
| EP | 1 081 511 A1 | 3/2001 |
| WO | 96/42025 A1 | 12/1996 |

* cited by examiner

*Primary Examiner*—James Phan
(74) *Attorney, Agent, or Firm*—Roberts Mlotkowski Safran & Cole, P.C.; Thomas W. Cole

(57) ABSTRACT

Both a metallized cube corner retroreflective sheeting having a high measured daytime luminance factor and a method of manufacture thereof are provided. The sheeting is formed from a transparent planar sheet material including on one side a dense array of retroreflective cube corners having height H. The cube corners are canted edge-more-parallel by within about 1.5 degrees of 10n-9 degrees, where n is the index of refraction within the cube corners, and the cube corner faces are metallized by the application of a thin coating of reflective metal. The thickness of the sheet material between the bases of the cube corners and the opposite side of the sheeting is preferably between 1.75 H and 4.00 H. The resulting metallized, retroreflective sheet material may be mounted on a vehicle to increase its nighttime visibility through the ability of the sheet material to efficiently retroreflect a beam of light from a headlight or other source across a broad range of incident and orientation angles. Advantageously, the sheeting also reflects at least about 3.5% of normal and near normal light at angles within 5° of 45° obliquity, advantageously giving it a high measured daytime luminance factor as required by transportation regulations.

19 Claims, 5 Drawing Sheets

METALLIZED CUBE CORNER RETROREFLECTIVE SHEETING HAVING A HIGH MEASURED DAYTIME LUMINANCE FACTOR

FIELD OF THE INVENTION

This invention generally relates to retroreflective sheet materials, and is specifically concerned with a metallized retroreflective cube corner sheet material having a high measured daytime luminance factor, and a method of manufacture thereof.

BACKGROUND

Retroreflective sheeting is known in the prior art. Such sheeting includes an array of independently retroreflecting optical elements. The elements may be spheres or prisms. Mutually contiguous pyramidal prisms can be molded or embossed on one side of a transparent sheet material usually formed from plastic. The prisms have three faces which intersect each other at 90° angles. Such pyramid-shaped prisms are known in the art as cube corners. Cube corner prisms, uncoated with a reflective metal layer, possess the property of total internal reflection (TIR) for incident rays of light that impinge the surfaces of the cube corner within a certain critical range of angles. Consequently, a substantial portion of a beam of light directed at such a cube corner array will be retroreflected back in the direction of its source if it impinges the array within the critical range of angles. Alternatively, the cube corner prism faces can be coated with a reflective metal layer to be effective for more incident rays.

Retroreflective sheet material is used to enhance the nighttime visibility of street and highway signage, as well as trucks, buses and semi-tractor trailers that often travel along interstate highways. In the latter application, strips of retroreflective material are typically adhered around the edges of the trailer so that other motorists in the vicinity of the vehicle will readily perceive not only the presence but also the extent of the vehicle. The use of such retroreflective strips on trucks and other vehicles has doubtlessly contributed to the safety of the highways by preventing nighttime collisions which would otherwise have occurred.

Road signs also use retroreflective sheet material, but the requirements differ in two important ways. Truck stripes have no need to be conspicuously light by day, as road signs do. Truck stripes must be able to retroreflect light at very large angles of incidence, which few road signs must do.

Metallized cube corner sheeting generally performs better under nighttime conditions than unmetallized cube corner sheeting. Unmetallized cube corners rely entirely on TIR for reflection. Consequently, light which impinges on the prism faces at an angle greater than the critical angle will be reflected only feebly. For example, for retroreflective sheeting formed from a transparent material having an index of refraction of n =1.5 the critical angle is about 41.82°. Light incident at a face at 41° loses 62% of its intensity. A cube corner prism with unmetallized faces may have one or two faces failing TIR for a particular incoming illumination. By contrast, when the cube corners of a retroreflective sheeting are metallized by the application of a thin coating of a specular material such as aluminum or silver, a substantial percentage of incident light will always be retroreflected regardless of the angle of incidence. Even though the total effective reflectance is only about 61% after the incident light impinges all three of the cube corner surfaces necessary for retroreflectivity, considering all incidence and orientation angles, the net rating for retroreflection is generally higher with metallized vs. unmetallized cube corners. Another advantage of metallized versus unmetallized cube corners is that metallized cube corners do not require a hermetic seal of the surface of the sheet material where the cube corners are molded or embossed. Such hermetic seals sacrifice about 25-30% of the total sheeting area, rendering unmetallized sheeting dimmer than it otherwise would be when exposed to a beam of an automobile headlight. In short, the higher retroreflectance of metallized versus unmetallized retroreflective sheeting over a broader range of incidence angles in combination with the non-necessity of hermetic seals renders it generally brighter under nighttime conditions.

Unfortunately, presently-known forms of metallized cube corner sheeting perform poorly under daytime conditions. This is a major shortcoming, as transportation regulations in the United States, Europe, China and Brazil require such sheeting to have a minimal daytime luminance factor as measured by a 0/45 or 45/0 calorimeter. In contrast to non-metallized cube corner sheeting material, metallized sheeting can appear relatively dark under daytime conditions. This deficiency in daytime luminance has resulted either in the use of non-metallized cube corner sheet materials which are inherently more limited in their nighttime performance or in the use of metallized cube corner sheet materials having white marks printed over some fraction of the of the surface, or white spaces between prisms, which enhance daytime luminance but degrade nighttime performance.

Clearly, there is a need for a metallized cube corner retroreflective sheeting which maintains all of the nighttime performance advantages of such sheeting, but which also complies with the daytime luminance standards mandated by transportation regulations. Ideally, such sheet material should be relatively easy and inexpensive to manufacture and mount on a vehicle.

SUMMARY OF THE INVENTION

Generally speaking, the invention is a metallized retroreflective sheeting capable of reflecting a relatively high percentage of normal and near normal incident light at an approximately 45° angle that can also efficiently retroreflect a beam of light under nighttime conditions. The ability to reflect a higher percentage of near normal incident light at an approximately 45° angle relative to prior art sheeting gives the sheeting an unusually high measured daytime luminance factor.

The sheeting comprises a dense array of retroreflecting cube corners having an average uniform height H on one side of a transparent, planar sheet material wherein the cube corners are canted in an edge-more-parallel way within about 1.5 degrees of 10n-9 degrees, with n being the refractive index of the transparent sheet material forming the cube corners. Hence, when plastic materials having refractive indices between about 1.45 and 1.65 are used, the cube corners will be canted between about 4.0° and 9.0°. A reflective coating is provided on the cube corners. Finally, the average thickness of the sheet material between the bases of the cube corners and its opposite side is between about 0.75 H and 4.50 H. The edge-more-parallel canting of the cube corners in accordance with the aforementioned formula in combination with the 0.75 H to 4.50 H sheet material thickness has been found to provide a high luminance factor Y (i.e., >0.20) relative to prior art metallized cube corner sheet as measured by a 0/45 or 45/0 calorimeter. Additionally, such metallized cube corner sheeting provides excellent retroreflectivity under nighttime conditions both in terms of absolute brightness, and in the ability to efficiently retroreflect over a relatively large range of incident rays.

The axis of a cube corner is the line from its apex that makes equal angles with its three faces. A cube corner is said to be canted if its axis is not normal to the sheeting front surface. For the purpose of this patent, every canted cube corner is said to be canted either edge-more-parallel or face-more-parallel according to the following definition: For a canted cube corner, if the minimum of the three angles between the dihedral edges and the sheeting front surface is at least 19.472° less than the minimum of the three angles between the cube faces and the sheeting front surface, then the cant is edge-more parallel; otherwise it is face-more-parallel. For example, the isosceles triangle cube corners illustrated in FIG. 1 might be canted 7.5 degrees edge-more-parallel. In this case, considering the cube illustrated in the lower right of the Figure, the angle between each of the dihedral edges 11a and 11c and the sheeting front surface would be found to equal 38.733°; the angle between dihedral edge 11b and the sheeting front surface would be found to equal 27.764°. The minimum is 27.764°. Also the angle between each of the faces 7a and 7c and the sheeting front surface would be found to equal 51.267°; the angle between face 7b and the front surface would be found to equal 62.236°. The minimum is 51.267°. The first minimum is 23.502° less than the second minimum, which difference is greater than 19.472°, confirming that the cant is edge-more-parallel according to the definition. The definition applies as well to scalene triangle cubes.

The sheet material is preferably covered at all points with mutually-contiguous cube corners to maximize nighttime performance. In the preferred embodiment, the reflective coating is aluminum, although it may be formed from silver or any other specular material capable of reflecting a large fraction of incident light. The sheet material may be formed from a plastic material such as acrylic or polycarbonate or polyester having an index of refraction of between about 1.45 and about 1.65. Further, the thickness between the bases of the cube corners and the opposite side of the planar sheet material is preferably between about 1.5 H to about 4.0 H, where H is the height of the cube corner prism measured from base to apex, and when the index of refraction is 1.49 (as would be the case when acrylic is used) is most preferably within one of the ranges of 2.00 H to 2.75 H and 3.25 H to 3.75 H. The array of cube corners may be formed from a ruling of three sets of parallel vee-grooves that intersect such that each cube corner, when viewed in plan, is surrounded by a triangle or quasi-triangle formed by the roots of the vee-grooves. The surrounding triangles may be isosceles or scalene. Additionally, the depths of the vee-grooves may be equal or unequal.

In addition to the retroreflective sheet material itself, the invention also encompasses a method for fabricating a retroreflective sheet material having a relatively high measured daytime luminance.

DETAILED DESCRIPTION OF THE PREFERRED EMBODIMENT

Figure 1:
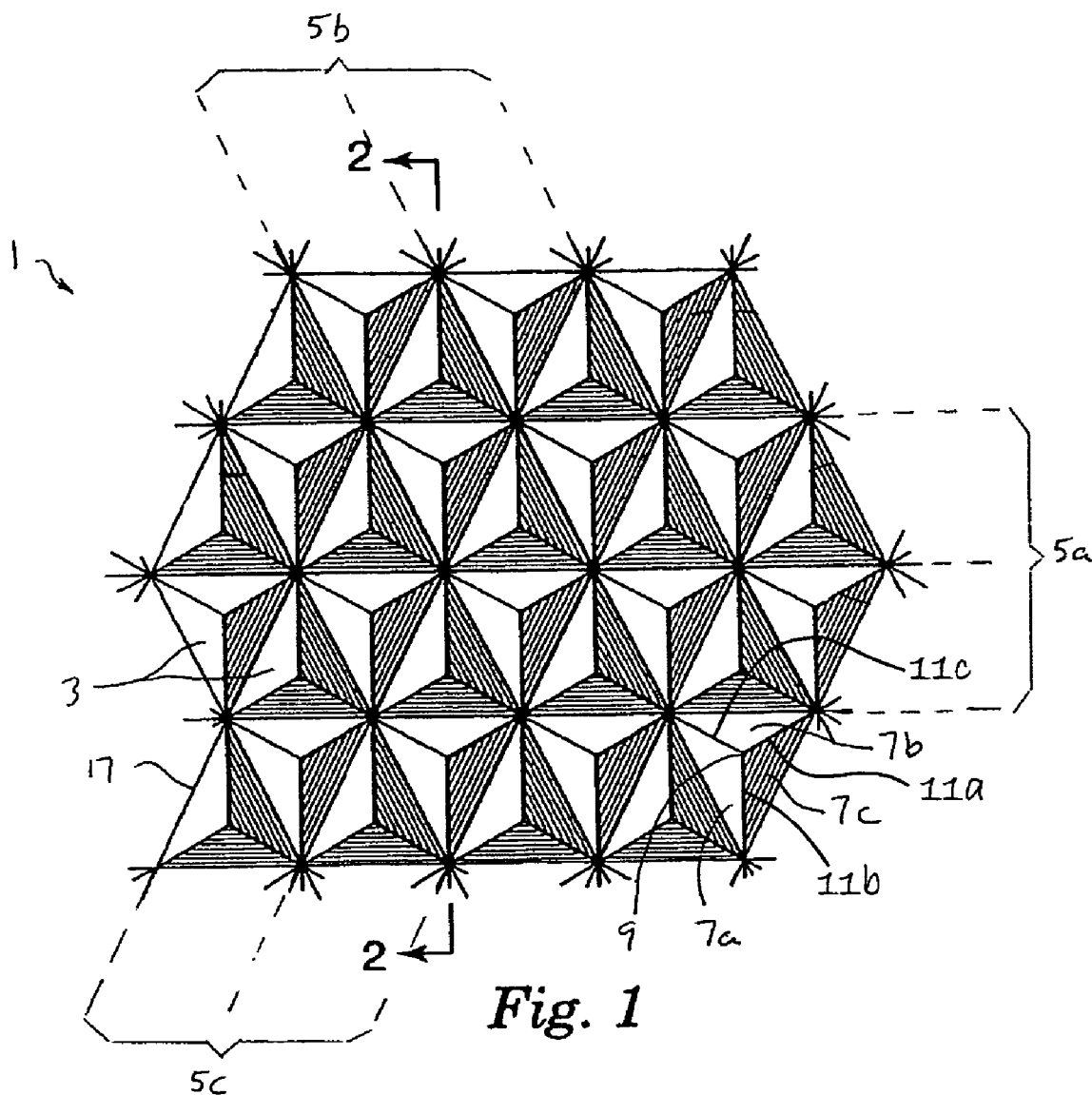
FIG. 1 is a plan view of a section of cube corner sheeting material that embodies the invention.
Figure 2:
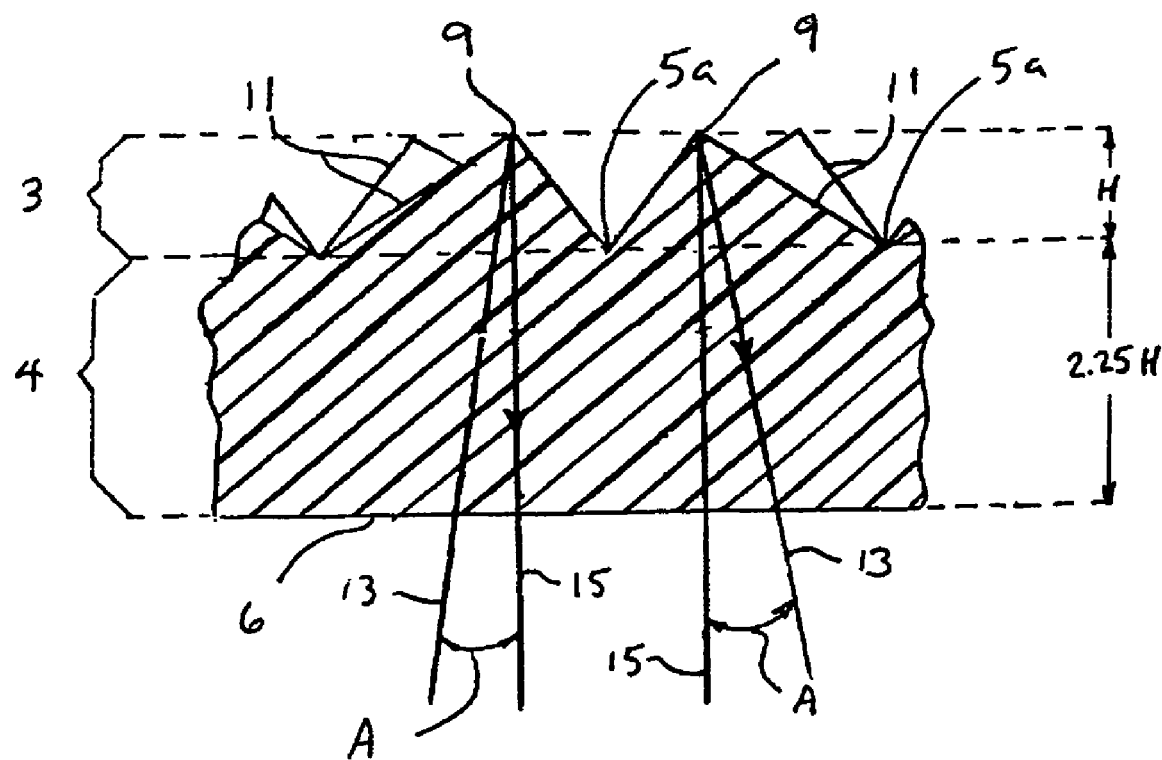
FIG. 2 is a cross-section of the sheeting illustrated in FIG. 1 along the line 2-2.

With reference to FIGS. 1 and 2, the retroreflective sheet material 1 of the invention generally comprises a dense array of cube corners 3 integrally formed over a top surface of a substrate 4 having a planar bottom surface 6. The cube corners 3 are defined by three sets of vee-grooves 5a, 5b and 5c. The directions and included angles of each of the sets of vee-grooves 5a, 5b and 5c are selected such that the three faces 7a, 7b and 7c of each of the cube corners 3 intersect one another at right angles. The roots of the vee-grooves 5a, 5b and 5c are preferably sharply defined to maximize the ability of the array of cube corners 3 to retroreflect. The cube corners also reflect some normal and near-normal incident light at an approximately 45° angle, which in turn promotes a relatively high measured daytime luminance, as explained hereinafter.

As is best seen in FIG. 2, the apices 9 of each of the cube corners 3 are preferably all of the same height H, while the height of the substrate 4 in this particular example is 2.25 H. It should be noted that the height of the substrate 4 relative to the height of the cube corners may be between 0.75 H and 4.5 H. Additionally, the sheeting 1 is preferably formed from a material having an index of refraction of between approximately 1.45 and approximately 1.65, such as acrylic or polycarbonate or polyester. The sheeting can also be formed from layers of materials of different refractive index. While the height H is equal for each of the groove roots 5a illustrated in the Figures, the invention encompasses sheeting wherein the heights H of the cube corners are irregular as a result of the roots of the vee-grooves 56a, 5b and 5c being formed at different depths in the substrate 4. Under such circumstances, the height H shall be construed as the average of the depths of the three groove roots 5a, 5b, 5c relative to apices 9, and the substrate thickness shall be construed as the average of the distances from the three groove roots 5a, 5b, 5c to the bottom surface 6. It is necessary measure to cube height and substrate thickness from the groove roots in this case of unequal groove depths because there are no triangular bases circumscribing the cube corners 3, but only quasi-triangular bases (i.e., triangles constructed from the apparent intersections of the vee groove roots 5a, 5b and 5c as seen in a planar view of the sheet material). The same ratios of H to substrate thickness shall apply to sheetings having cube corners 3 formed from equal depth grooves and from unequal depth grooves.

As is shown in FIG. 2, the outside surfaces of the cube corners 3 are preferably coated with a reflective metal, such as silver or aluminum, although other metals could be used to achieve the effect of the invention (e.g., silver alloys, platinum, gold, etc.). The cube corners 3 and substrate 4 are preferably integrally formed as indicated by heat embossing over a flat sheet of transparent plastic material with a metal form having a complementary shape. Molding or casting methods for forming cube corners are also possible. It should be noted that while the sheet of transparent plastic material may be all of a same kind of plastic, it may also be formed from layers of different kinds of plastic.

With reference again to FIG. 2, an axis 13 is the line that makes equal angles with the three faces of the cube corner. The cube axes 13 which extend through the apices 9 of each of the cube corners 3 are preferably tilted with respect to an axis 15 which is normal to the planar surface 6 of the substrate 4 of the sheeting 1. In the preferred embodiment, the angle A of axis tilt is between about 4.5° and 8.5°. A cube corner has cant when its axis is angled with respect to the sheeting normal. The cube cant angle is the axis tilt angle. The cube cant is further described as being either edge-more-parallel or face-more-parallel according to the definition given above. The cube corners of this invention have edge-more-parallel cant. The desired range of the cant angle may vary with the index of refraction of the material forming the sheeting. For example, if acrylic is used, the index of refraction would be about 1.49, and the cant angle would between about 4.5° and about 7.5°. By contrast, if a material having a higher index of refraction is used, such as polycarbonate, the cant angle would range between about 5.5° and about 8.5°. As a rule of thumb, the desired cant range is that within about 1.5 degrees or less of 10n−9 degrees where n is the refractive index of sheeting in the cubes.

Figure 8:
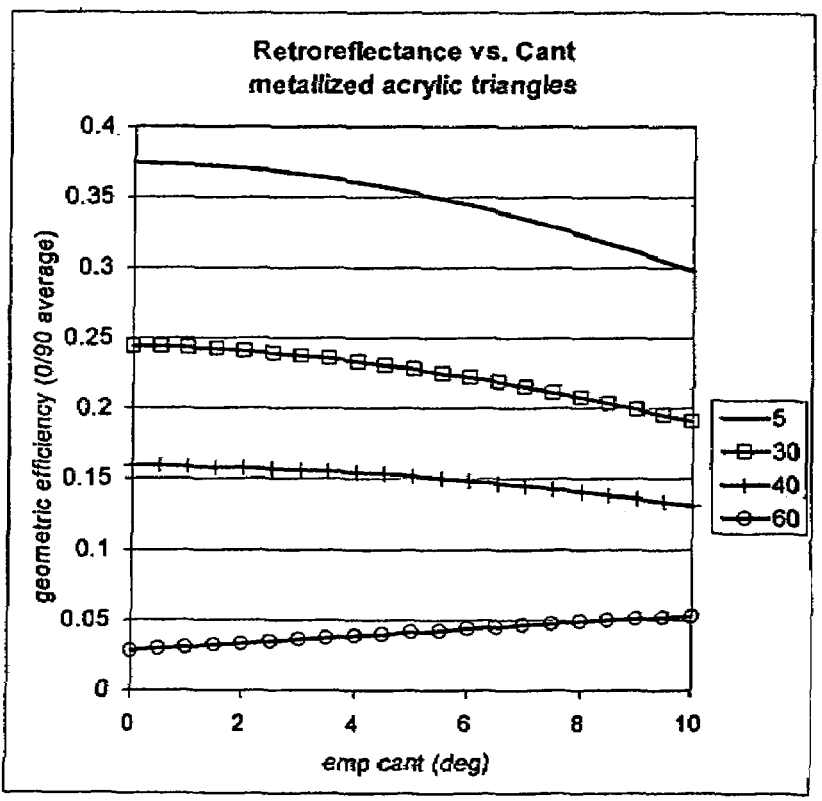
FIG. 8 is a graph illustrating the changes in retroreflectance of metallized cube corners depending on their edge-more-parallel cant.

Canting metallized triangular cube corners affects the retroreflective efficiency. FIG. 8 shows how the geometrical efficiency varies with the cant at four incidence angles 5°, 30°, 40° and 60°. In FIG. 8 the efficiencies at 0° and 90° orientation angles were averaged, as would be the case with a "pinned" or "tiled" array consisting of those two orientations. This is reasonable for truck marking material, which is applied both ways on the truck. As is evident from a comparison of the graph, while an edge-more-parallel cant increases the efficiency of retroreflectance at the larger angles of incidence (i.e., 60°), it decreases the efficiency of retroreflectance at the smaller angles (5°, 30° and 40°). The inventor has found that a cant of between 4.5° and 8.5° optimizes overall performance for all orientations and incidence angles for both nighttime performance and measured daytime luminance factor.

In the preferred embodiment illustrated in FIG. 1, the three sets of vee-shaped grooves 5a, 5b and 5c define an array of isosceles triangles which circumscribe the base 17 of each of the cube corners 3. However, the invention also encompasses cube corners having bases that are defined by scalene triangles and cube corners formed by grooves of unequal depth which thereby do not circumscribe a triangle base. These latter cube corners are called quasi-triangular, as defined earlier.

Figure 3:
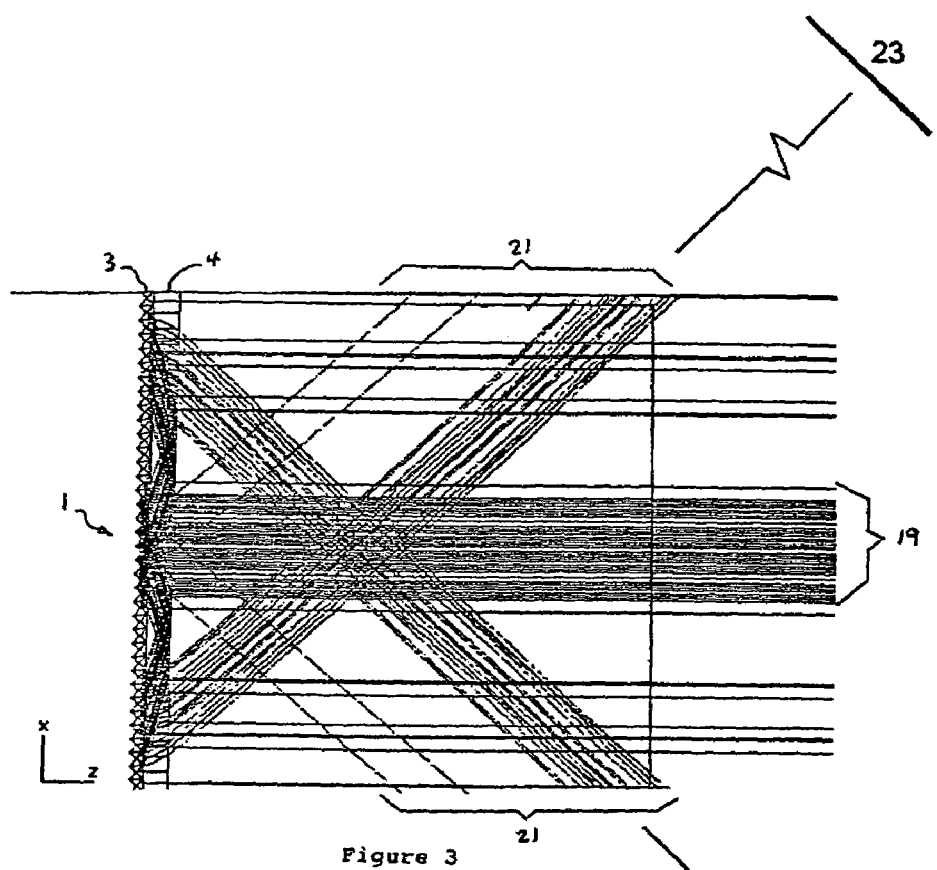
FIG. 3 is a multiple ray-trace graph illustrating how the metallized, retroreflective sheet material of the invention reflects a relatively high percentage of zero degree incident light into the 45°-located sensors of a colorimeter.

FIG. 3 is a ray-trace simulation of how an idealized colorimeter would "see" the sheeting of the invention during a luminance test. In this simulation, the cube corners 3 have an edge-more-parallel cant of 5°, and the height of the substrate 4 is 2H, twice the height H of the cube corners 3, and the index of refraction is 1.50. In this simulation, a large fraction of light 19 incident on the sheeting 1 at an incidence angle β of approximately 0°, which does not retroreflect, appears to be reflected by the sheeting 1 at either a 0° angle or an approximately 45° angle. This is only a single view, but the 45° angles are in the shown plane. The sensors 23 of the colorimeter are located in a ring at a 45° angle. FIG. 3 does provide an indication that a generous percentage of 0° incident light will be reflected directly into the sensors 23. Even more importantly, further such simulations indicate that incoming light 19 which impinges on the sheeting 1 at a nearly-normal angle will also ultimately be reflected as outgoing light 21 at nearly such a 45° angle. The inventor believes that the 45° reflection may be due to incident light 19 being not retroreflected by a first cube corner 3 but instead reflected at large obliquity to the front surface of substrate 4 where TIR returns it to another cube corner 3. This process of cube corner jumping might continue to yet other cube corners 3. The final cube corner sends the light less obliquely to the front surface of the substrate 4 where it finally re-emerges from the sheeting 1 at a 45° angle. The end result is that a disproportionately high percentage of both normal and near-normal incoming light 19 is ultimately reflected by the sheeting 1 directed into the 45° and near −45° located sensors 23 present in 0/45 calorimeters. Optical reversibility assures similar results with 45/0 colorimeters. Such a pattern of reflection results in a very high measured daytime luminance factor that often approaches 0.40, as will be discussed in more detail hereinafter.

While this specification describes the percentage of approximately 45° reflected light as being "high" or "generous" or words to like effect, it should be recognized that the percentage of 45° reflected light is high only in a relative sense to the amount of 45° reflected light produced by prior art retroreflective sheetings. Calculations indicate that only about 3.5% of normal and near-normal light needs to be reflected at a near 45° angle (namely, within plus or minus 5°) for a 0/45 colorimeter having such normal and near normal illumination and having light sensors filling that ring to obtain a relatively high Y value of 0.2. More generally, for a 0/45 colorimeter sensing within plus or minus D degrees of 45°, about 0.7 D percent of the colorimeter's illumination needs to be reflected into that sensor angle range for the Y value to be measured at 0.2.

Figure 4:
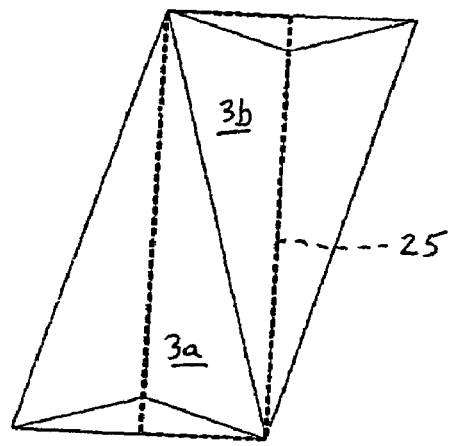
FIG. 4 illustrates a simulation technique used to verify the utility of the invention which utilizes a schematic of two half cube corners surrounded by a mirror box.
Figure 5:
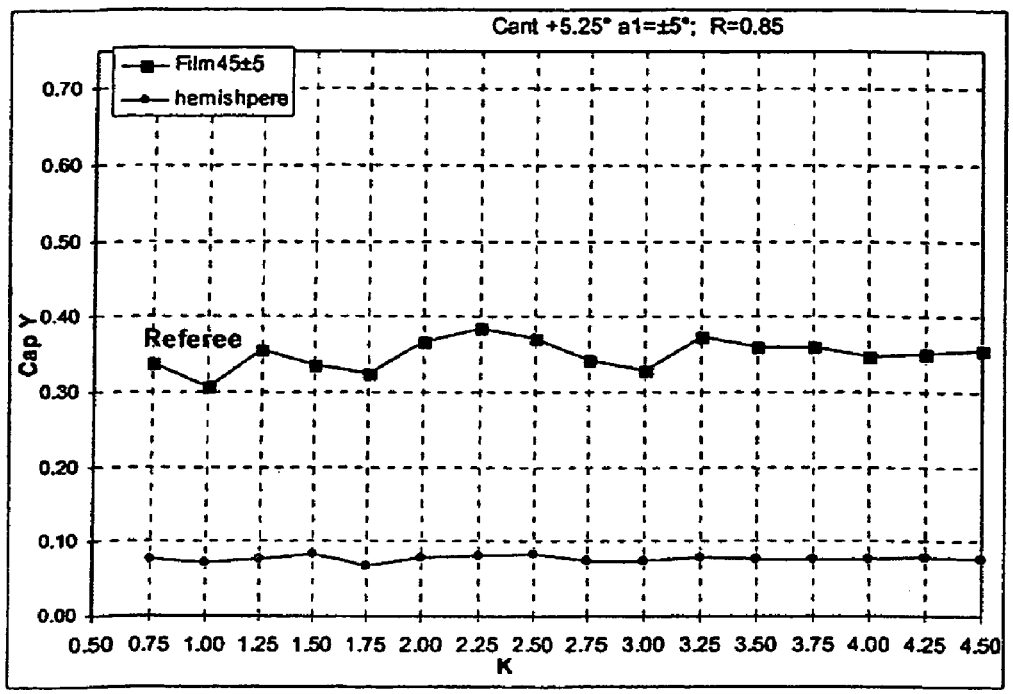
FIGS. 5, 6 and 7 are graphs illustrating changes in the luminance factor Y, as measured by three different makes of 0/45 or 45/0 calorimeters, for different thicknesses of the substrate in front of the cube corners. Each of these graphs also compares the performance of the cube corner sheeting of the invention with hemispheric (0/d) colorimetry.
Figure 6:
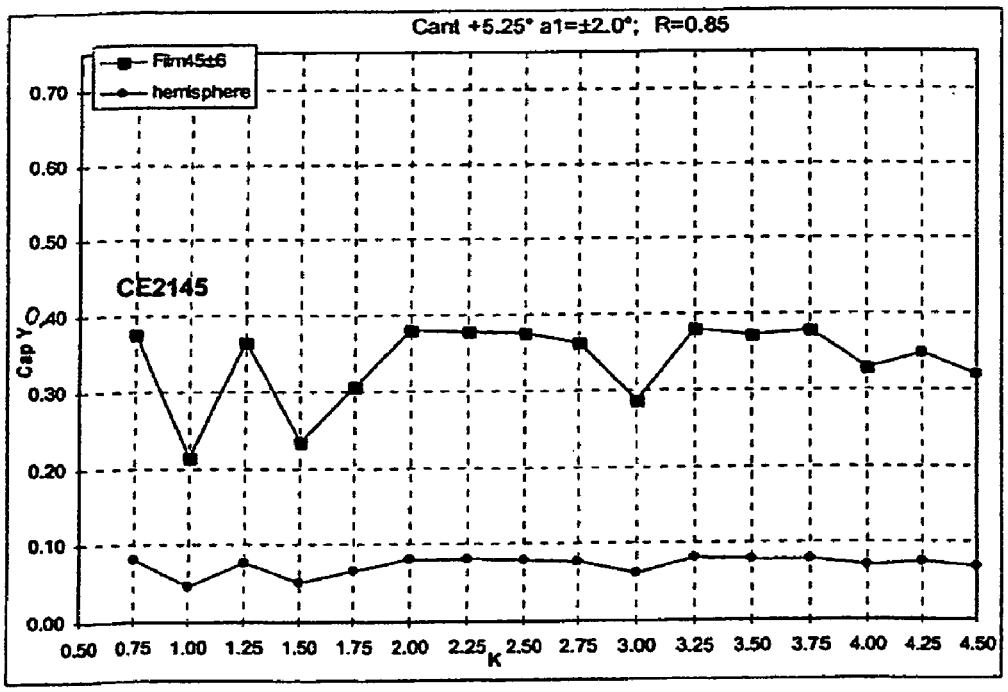
Figure 7:
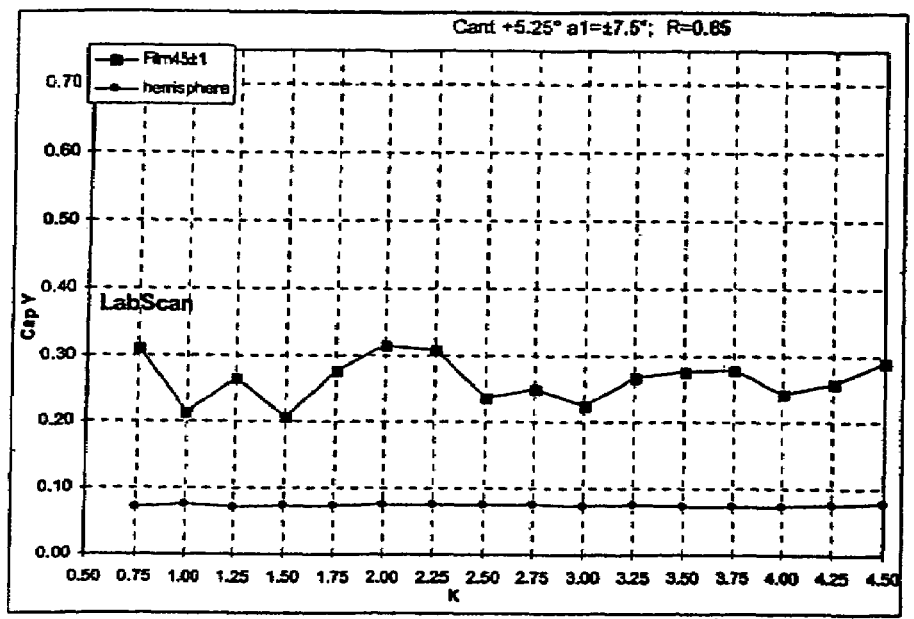

FIG. 4 illustrates the simulation technique that was used in generating the graphs illustrated in FIGS. 5, 6 and 7. Specifically, FIG. 4 illustrates two half cube corners 3A and 3B surrounded by a simulated mirror box 25 illustrated in phantom. For the purposes of the simulations illustrated in the graphs of FIGS. 5, 6 and 7, it is assumed that the mirror box 25 has 100% reflective sides.

FIGS. 5, 6 and 7 illustrate the results of a ray-trace simulation using the two half cubes and mirror box of FIG. 4. The simulations of FIGS. 5, 6 and 7 assumed a cube corner cant angle of 5.25° and a material having an index of refraction of 1.49, such as acrylic. The vertical axis is the resulting 0/45 luminance factor (Y), while the horizontal axis indicates that thickness of the substrate 4 of the sheeting 1 relative to the height of the cube corners. For comparison purposes in each of the simulations illustrated in FIGS. 5-7, a luminance factor as measured with hemispheric geometry (0/d) (whose graph markers are round dots) is also included. Luminance factor as measured with hemispheric geometry approximates the daytime lightness that the sheeting of the invention is likely to present to an actual observer. As is evident in these Figures, the measured 0/45 daytime luminance factor is between two and four times the realistic daytime luminance factor.

FIG. 5 is the simulated result using an ASTM E2301 "referee" 0/45 calorimeter. The instrument details are given in section 6 of this ASTM Standard Test Method. In this particular device, the incoming light 19 fills a cone of 5° half-angle relative to normal impingement. The sensors 23 are mounted in a ring which surrounds the front face of the sheeting 1. The sensors are located to cover 45°±5° of obliquity. As can be seen from the graph, in all cases the metallized sheeting 1 of the invention has a high measured reflectance Y (over 0.30) across an entire range of substrates thicknesses of 0.75 H through 4.50 H. In particular, a measured reflectance of close to 0.40 occurs with substrate thicknesses of 2.00 to 2.50 H, and again at 3.25 through 3.75 H.

FIG. 6 illustrates the simulated result for a commercial Gretag MacBeth model CE2145 instrument. For purpose of simulation this 45/0 instrument was treated as a 0/45 instrument. Such a colorimeter would test the sheeting 1 with incoming light 19 filling a narrow cone of 2° half-angle around normal impingement, and in turn would measure the intensity of outgoing light 21 with a ring having sensors 23 covering 45°±6° of obliquity. As is evident from the graph of FIG. 6, a measured luminance factor approaching 0.40 occurs with a substrate height that is between 2.00 to 2.75 H, and 3.25 to 3.75 H.

Finally, FIG. 7 illustrates a simulated test of the sheeting 1 of the invention with an older commercial Hunter Lab Scan model 6000 instrument. Such a calorimeter supplies a cone of incoming light 19 that is within 7.5° of normal impingement, and has a ring of sensors covering 45°±1° obliquity. While the simulation on the Hunter Lab Scan colorimeter indicated lower measured luminance values across the range of substrate heights which barely broke above 0.30, the maximums were again situated in the height ranges of 1.75 to 2.25 H and 3.25 to 3.75 H.

In all of the aforementioned simulations, the sample area was assumed to be infinitesimally small compared to the other colorimeter dimensions. This is equivalent to assuming telecentric optics in the colorimeter, which is not entirely realistic. Accordingly, the actual values may be somewhat less than the values obtained during the simulations illustrated in FIGS. 5-7. Nonetheless, the measured luminance factors in all cases are substantially higher than the measured luminance factors associated with prior art retroreflective sheet materials whether by simulation or in actual fact.

What is claimed is:

1. A retroreflective sheeting capable of reflecting a relatively high percentage of light that is incident normally and substantially normally non-retroreflectively at an approximately 45° angle and which is particularly adapted for effectively retroreflecting light under nighttime conditions, comprising:

a substantially planar transparent sheet having a dense array of cube corners and a substrate, said cube corners being canted edge-more-parallel at an angle within about 1.5 degrees of 10n-9 degrees as calculated with n being the refractive index of the sheeting in the cube corners, wherein said cube corners are coated with reflective material, and said substrate has a thickness in a range of between about 0.75 and about 4.50 times a cube corner height H, wherein said cube corners are formed from a ruling of three sets of parallel vee-grooves that intersect such that each cube corner, when viewed in plan, is surrounded by a triangle or quasi-triangle formed by the roots of the vee-grooves.

2. The sheeting defined in claim 1, wherein said cube corners are canted to within about 1 degree of the said 10n-9 degrees.

3. The sheeting defined in claim 1, wherein said cube corners are canted to within about 0.5 degrees of the said 10n-9 degrees.

4. The sheeting defined in claim 1, wherein said substrate thickness of said sheet material is between about 1.75 H and 4.00 H.

5. The sheeting defined in claim 4, wherein said substrate thickness of said sheet material is within one of the ranges of between about 2.00 H to 2.75 H and 3.25 H to 3.75 H.

6. The sheeting defined in claim 1, wherein said sheet material is formed from one or more plastics with refractive indices in the range 1.45 to 1.65.

7. The sheeting defined in claim 1, wherein said sheet material is formed from one or both of acrylic and polycarbonate.

8. The sheeting defined in claim 1, wherein roots of said vee-grooves form non-isosceles triangles around said cube corners.

9. The sheeting defined in claim 1, wherein the three sets of vee-grooves have roots of not all of the same depth relative to the apices of the cube corners.

10. The sheeting defined in claim 1, wherein the sheeting is capable of reflecting at least about 3.5% of the light that is incident within 5° of normal to between 40° and 50° of normal.

11. A retroreflective sheeting capable of reflecting a relatively high percentage of light that is incident normally and substantially normally non-retroreflectively at an approximately 45° angle and which is particularly adapted for effectively retroreflecting light under nighttime conditions, comprising:

a substantially planar transparent sheet having a dense array of cube corners and a substrate, said cube corners being canted edge-more-parallel at an angle within about 1.5 degrees of 10n-9 degrees as calculated with n being the refractive index of the sheeting in the cube corners, wherein said cube corners are coated with reflective material, and said substrate has a thickness in a range of between about 0.75 and about 4.50 times a cube corner height H, wherein the cube corners are defined by three sets of vee-grooves having roots of equal depth relative to the apices of the cube corners, and said roots of said vee-grooves define isosceles triangles around said cube corners.

12. The sheeting defined in claim 11, wherein the cube corners are canted edge-more-parallel at an angle within about 1 degree of 10n-9 degrees.

13. The sheeting defined in claim 11, wherein the cubes are canted edge-more-parallel at an angle within about 0.5 degrees of 10n-9 degrees.

14. The sheeting defined in claim 11, wherein said reflective material is one of aluminum and silver.

15. The sheeting defined in claim 11, wherein the sheeting is capable of reflecting at least about 3.5% of the light that is incident within 5° of normal to between 40° and 50° of normal.

16. A retroreflective sheeting capable of reflecting a relatively high percentage of light that is incident normally and substantially normally non-retroreflectively at an approximately 45° angle and which is particularly adapted for effectively retroreflecting light under nighttime conditions, comprising:

a substantially planar transparent sheet having a dense array of cube corners and a substrate, said cube corners being canted edge-more-parallel at an angle within about 1.5 degrees of 10n-9 degrees as calculated with n being the refractive index of the sheeting in the cube corners, wherein said cube corners are coated with reflective material, and said substrate has a thickness in a range of between about 0.75 and about 4.50 times a cube corner height H, wherein said retroreflective sheeting, when measured with a 0/45 colorimeter with illumination extending to 5 degrees from normal and having detection in an annulus spanning from 40 degrees to 50 degrees will have a luminance factor greater than 0.20.

17. The sheeting defined in claim 16, wherein the sheeting is capable of reflecting at least about 3.5% of the light that is incident within 5° of normal to between 40° and 50° of normal.

18. The sheeting defined in claim 16, wherein the luminance factor is greater than 0.25.

19. The sheeting defined in claim 16, wherein the luminance factor is greater than 0.30.

* * * * *

UNITED STATES PATENT AND TRADEMARK OFFICE
CERTIFICATE OF CORRECTION

PATENT NO.       : 7,445,347 B2
APPLICATION NO. : 11/269903
DATED            : November 4, 2008
INVENTOR(S)      : Dennis I. Couzin It is certified that error appears in the above-identified patent and that said Letters Patent is hereby corrected as shown below:

Column 2, line 19, please delete "calorimeter", and insert therefor --colorimeter--.

Column 2, line 65, please delete "calorimeter", and insert therefor --colorimeter--.

Column 4, line 6, please delete "calorimeter", and insert therefor --colorimeter--.

Column 6, line 12, please delete "calorimeter", and insert therefor --colorimeter--.

Column 6, line 56, please delete "calorimeter", and insert therefor --colorimeter--.

Column 7, line 14, please delete "calorimeter", and insert therefor --colorimeter--.

Signed and Sealed this

Third Day of March, 2009

JOHN DOLL
*Acting Director of the United States Patent and Trademark Office*